Figure 15:
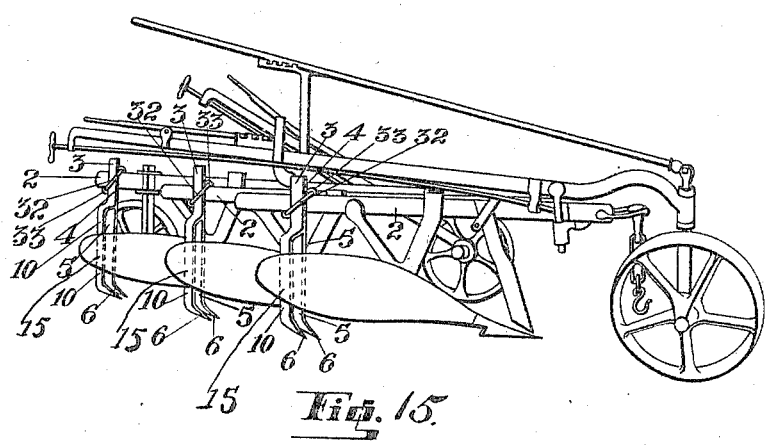

R. M. KEMP.
SUBSOIL CULTIVATOR ATTACHMENT FOR PLOWS.
APPLICATION FILED OCT. 25, 1907.
950,852.
Patented Mar. 1, 1910.
2 SHEETS—SHEET 1.
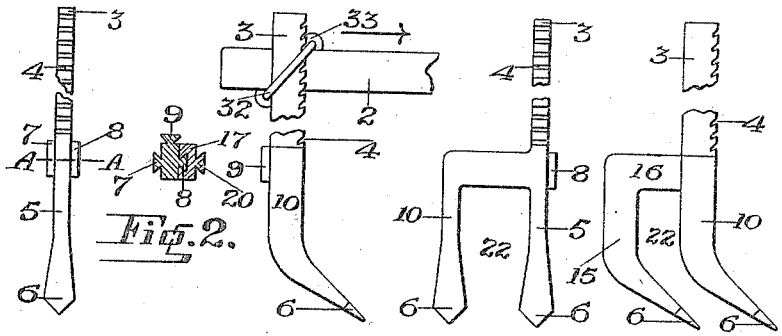
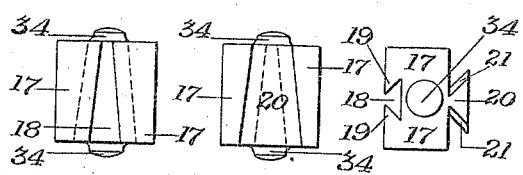
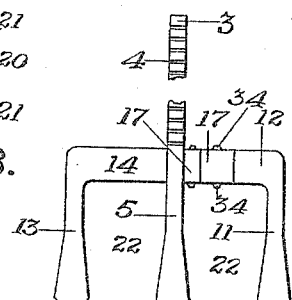
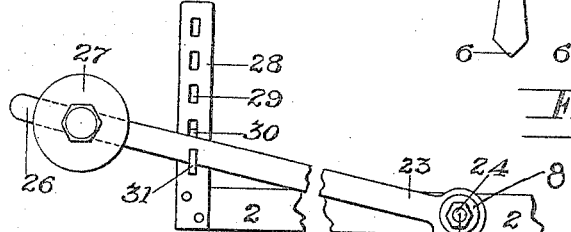
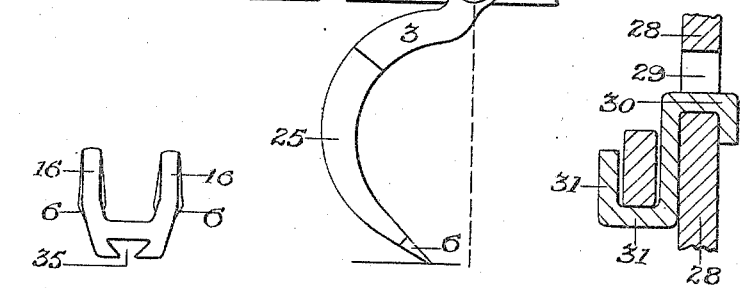
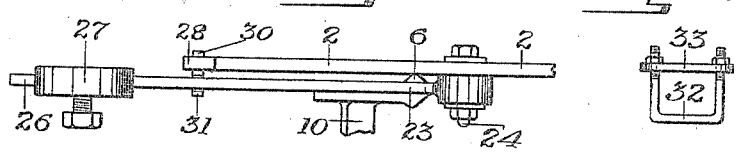

UNITED STATES PATENT OFFICE.

RANDOLPH MEREDITH KEMP, OF DURHAM OX, NEAR PYRAMID HILL, VICTORIA, AUSTRALIA.

SUBSOIL-CULTIVATOR ATTACHMENT FOR PLOWS.

950,852.  Specification of Letters Patent.  Patented Mar. 1, 1910.

Application filed October 25, 1907. Serial No. 399,189.

*To all whom it may concern:*

Be it known that I, RANDOLPH MEREDITH KEMP, a subject of the King of Great Britain and Ireland, residing at Durham Ox, near Pyramid Hill, in the county of Gunbower, State of Victoria, Commonwealth of Australia, farmer, have invented certain new and useful Improvements in a Subsoil-Cultivator Attachment for Plows, of which the following is a specification.

My invention relates to single or multiple furrow stump jumping or ordinary plows for plowing the top soil.

In some countries and under some conditions it is also necessary to cultivate the sub soil. This has been performed in a variety of ways, sometimes by passing over the ground a second and separate implement.

The object of my invention is to provide a special cultivator for attachment to plows whereby as the top soil is plowed first the sub soil is treated immediately after by my said attached cultivator. Both operations are thus performed by the same implement.

My special cultivator is capable of a rapid backward and forward adjustment along the plow frame or an extension therefrom, a quick up and down adjustment, its bottom end is easily inclined backwardly or forwardly, the width of the earth passage between the prongs can be increased or diminished and the said earth passage permits the distributed earth to pass freely between the said prongs.

In a modification, my cultivator is so constructed that it lifts and rises above an obstruction when it meets it, the cultivator prong points are behind a pivot pin situated above them, the prong points are raised or lowered by raising or lowering a weight lever, the position of which can be adjusted by a catch.

With my invention the hard pan or surface earth left by the foot of the plow as regards the sub soil moisture is broken up with a minimum of evaporation.

Referring to the drawings which form a part of this specification, Figure 1 is a front elevation of a cultivator shank, center prong, prong body and prong point. A right and a left hand lug for supporting right and left hand side prongs is seen. Fig. 2 is a section as if taken through A—A Fig. 1, but showing a distance piece in position on one of the said lugs. Fig. 3 is a side elevation of the device in operative position. A back lug is also shown to which a back prong can be affixed. Fig. 4 is a front elevation of a cultivator shank, center prong and a right hand side prong integral therewith. A lug to affix a left hand side prong is apparent. Fig. 5 is a side elevation of two subsoil blades and their standards joined together. Fig. 6 is an elevation, on an enlarged scale of the recess surface of a distance piece. Fig. 7 is an elevation, on an enlarged scale, of the lug surface of the distance piece. Fig. 8 is a plan, on an enlarged scale, of a distance piece. Fig. 9 is a front elevation of a cultivator shank, center prong, and right and left hand side prongs. The distance between the center prong and the left hand side prong has been adjusted by the insertion of two distance pieces. The top of the right hand side prong is shown as being of greater length than that of the left hand side prong. Distance pieces are, therefore, not in this instance used with the said right hand side prong unless the width of the earth passage is required to be greater. Fig. 10 is a plan of two united back prongs or a double back prong. Fig. 11 is a side elevation of a cultivator the shank of which is integral with a pivoted weight lever. Fig. 12 is a side sectional elevation of a portion of the vertical adjusting bar and catch. Fig. 13 is a plan of Fig. 11. A portion of the right hand side prong is removed for convenience of illustration. Fig. 14 is a view of the strap and its accompaniments for attaching the cultivator shank. This strap is shown in position in Fig. 3. Fig. 15 is a perspective view of a cultivator provided with the improvements of the present invention.

Similar numerals indicate similar or corresponding parts where they occur in the several views.

My invention includes a cultivator or more definitely speaking a cultivator tooth (here termed a cultivator) for attachment behind the share or shares of a plow. The cultivator is secured to the bar or portion 2 of the plow frame and is provided with a shank 3. The said shank is attached by a strap 32 (see Figs. 3 and 14). The legs of this strap are threaded and pass through a strap plate 33. Outside the strap plate are tightening nuts.

The aforesaid shank has front notches 4 therein. Below the shank is a main prong body 5 (Figs. 1, 4 and 9). Below the body are the enlarged forwardly turned prong points 6. To the said shank are (dependent upon circumstances) integrally attached one, two or three lugs, namely, a right hand lug 7, a left hand lug 8 or a back lug 9 (Figs. 1, 2, 3 and 4). The sides of each of the said lugs diverge downwardly. Each side is also undercut as seen in Fig. 2. Instead, however, of there being three lugs attached to a shank there may be only two, since instead of there being a right hand lug protruding from the said shank there may be a right hand side integral prong 10 (Figs. 3, 4, and 5). This has an enlarged forwardly turned prong point 6 similar to the main prong point. Between the side and back prongs and the body of the main prong 5 are earth passages 22.

To the left hand lug may be attached a removable left hand side prong 11 and to the right hand lug a removable right hand side prong 13 (Fig. 9). These have forwardly turned enlarged prong points 6 and a left prong top 12 and a right prong top 14. In each of the said prong tops is a vertical dovetailed recess similar to that in the back prong (Fig. 10) and in the distance pieces hereinafter described. The said vertical recesses are shown in the said Fig. 9 of the drawings as passing over the right hand lug 7 and the lug of a distance piece hereinafter described and as will be hereinafter more fully understood.

Attached to the back lug 9 is a removable back prong 15 (Fig. 5). This back prong 15 has an enlarged forwardly turned prong point 6, a prong top 16 and a vertical dovetailed recess 35 (Fig. 10). It has undercut sides as shown. If the cultivator has three front prongs and two back ones the two back ones are united at their tops as seen in Fig. 10. Each double back prong is centrally situated between two front prongs.

Interposed between each removable prong and its lug may be situated a distance piece 17 (Figs. 2, 6, 7, 8 and 9). Each said distance piece 17 has on one surface of it a dovetailed lug recess 18. Upon the other surface of the said distance piece is a lug 20 having undercut sides 21. Protruding beyond the top and the bottom surface of each said distance piece is an elevated head 34 which may be struck by an implement when it is desired to remove the piece. The area, contour, shape of crown and height of this will depend upon circumstances. The distance pieces may be of varying widths as shown in Fig. 9.

In a modification (Figs. 11, 12 and 13) instead of the shank 3 being secured to the frame or an extension thereof 2, it may be bowed as at 25 and attached to the front end 23 of a weight lever. The right and left hand side prongs may also be bowed. The said front end 23 is pivoted to a pivot pin 24 protruding from the said plow frame or extension thereof. The three prong points 6 are vertically behind the pivoting pin 24 so that the said prong points not only move when an obstruction is reached, but move circumferentially and rise. To the back end 26 of the said weight lever is attached a balance weight 27. This is capable of a longitudinal movement along the said weight lever. Adjacent to the said weight lever is a vertical adjusting bar 28. The bottom of this is secured to the frame or an extension thereof. In it are longitudinal or square holes 29. Into one of these holes passes the inner end 30 of a catch. The outer end 31 accommodates the weight lever.

I do not wish to be understood as limiting myself to the exact details of construction and arrangement described since various slight and immaterial modifications may be made therein without departing from the spirit and the scope of my invention.

My invention is operated as follows:—The cultivator shank can be rapidly moved backward and forward along the plow frame and then be secured. This is accomplished by the slackening or tightening of the strap 32. An up and down adjustment is also effected by slackening and tightening the said strap. The backward or forward inclination of the bottom end of the prongs is also adjusted by means of the strap 32. The width between the removable prongs is increased or diminished by the interposition or removal of a distance piece or pieces 17. If the distance between the prongs is to be increased the lug recess side of a distance piece is placed over one of the lugs protruding from the shank. The recess portion of a removable prong is then passed over the lug at the lug side of the distance piece. A tight joint between the lug and lug recess is made by driving the recessed distance piece or prong onto the said lug. The dislodgment of a distance piece only calls for the use of a hammer since a blow on an elevated striking head 34 separates the joints. In the modification shown at Figs. 11, 12 and 13 directly an obstruction is met the prong points ride over the same moving backwardly and upwardly. The depth that the prong points enter the ground can be varied by lifting or lowering the weight lever and adjusting the catch in the vertical adjusting bar 28.

Having now described my invention, what I claim as new and desire to secure by Letters Patent is—

1. The combination of a cultivator tooth having a shank and an engaging device thereon, an extension piece having a recess with undercut sides engaging said device, and a removable prong secured to said extension piece.

2. The combination of a cultivator tooth having a shank, a plurality of engaging devices thereon, said devices having undercut sides, and a removable prong, provided with a recess having corresponding undercut sides, secured to said devices.

3. The combination with a pivoted cultivator tooth and means for securing a detachable supplementary prong thereto, of a lever arm secured to the shank of the tooth, detachable means for supporting said arm, and an adjustable weight carried by the arm and normally holding the tooth in operative position.

4. The combination of a standard, a removable cultivator prong, a spacer block and dovetailed tongue and groove connections between the prong, spacer block and standard.

In testimony whereof I affix my signature in the presence of two subscribing witnesses.

RANDOLPH MEREDITH KEMP.

Witnesses:
   EDWIN PHILLIPS,
   CECIL W. LE PLASTRIER.